United States Patent
Pandey et al.

(10) Patent No.: US 10,581,625 B1
(45) Date of Patent: Mar. 3, 2020

(54) AUTOMATICALLY ALTERING THE AUDIO OF AN OBJECT DURING VIDEO CONFERENCES

(71) Applicant: INTERNATIONAL BUSINESS MACHINES CORPORATION, Armonk, NY (US)

(72) Inventors: Diwesh Pandey, Bangalore (IN); Aaron K. Baughman, Silver Spring, MD (US); Todd R. Whitman, Bethany, CT (US); John P. Perrino, Hedgesville, WV (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/196,580

(22) Filed: Nov. 20, 2018

(51) Int. Cl.
| | |
|---|---|
| *H04N 7/14* | (2006.01) |
| *H04L 12/18* | (2006.01) |
| *G06F 3/16* | (2006.01) |
| *G06F 9/451* | (2018.01) |
| *H04N 7/15* | (2006.01) |

(52) U.S. Cl.
CPC .......... *H04L 12/1822* (2013.01); *G06F 3/165* (2013.01); *G06F 9/453* (2018.02); *H04N 7/152* (2013.01)

(58) Field of Classification Search
CPC ....................................................... H04N 7/14
See application file for complete search history.

(56) References Cited

U.S. PATENT DOCUMENTS

| | | | |
|---|---|---|---|
| 6,844,893 B1 | 1/2005 | Miller et al. | |
| 8,386,252 B2 | 2/2013 | Michaelis | |
| 8,849,391 B2 | 9/2014 | Adachi et al. | |
| 9,204,094 B2 | 12/2015 | Mock | |
| 2012/0281128 A1 | 11/2012 | Shintani | |
| 2013/0344966 A1* | 12/2013 | Mustafa | A63F 13/12 463/42 |
| 2014/0179408 A1* | 6/2014 | Ducheneaut | G07F 17/326 463/23 |
| 2016/0014540 A1 | 1/2016 | Kelly et al. | |
| 2018/0144746 A1* | 5/2018 | Mishra | G10L 25/51 |
| 2019/0083886 A1* | 3/2019 | Taylor | A63F 13/54 |

OTHER PUBLICATIONS

ACM Search, https://www.acm.org/search?q=Cognitive+audio+voice+processing+augmentation, accessed Nov. 20, 2018, 3 pages.

(Continued)

*Primary Examiner* — Olisa Anwah
(74) *Attorney, Agent, or Firm* — James Nock; Andrew D. Wright; Roberts Mlotkowski Safran Cole & Calderon, P.C.

(57) ABSTRACT

A computer-implemented method includes: obtaining, by a computer device, monitoring data of a user participating in a video conference; determining, by the computer device, a level of understanding of the user based on the monitoring data; adjusting, by the computer device, an output of the video conference for the user based on the determined level of understanding being less than a threshold; and determining, by the computer device, a success of the adjusting and updating a learning model based on the determined success.

13 Claims, 4 Drawing Sheets

(56) References Cited

OTHER PUBLICATIONS

Association for Computing Machinery, https://www.acm.org, accessed Nov. 20, 2018, 8 pages.
IEEE Xploure Digital Library, https://ieeexplore.ieee.org/Xplore/home.jsp, accessed Nov. 20, 2018, 3 pages.
Hanson et al., "Accessibility and Computing", http://www.sigaccess.org/wp-content/uploads/formidable/sep05_all.pdf, 2005, 74 pages.
Google Search, https://www.google.com/search?q=+listener+based+Cognitive+audio+voice+processing+augmentation, accessed Nov. 20, 2018, 2 pages.
Google Search, https://www.google.com/search?q=videoconference+audio+tempo+patent&ie=utf-8&oe=utf-8, accessed Nov. 20, 2018, 4 pages.
IEEE Xplore Search, http://ieeexplore.ieee.org/search/searchresult.jsp?queryText=listener%20based%20Cognitive%20audio%20voice%20processing%20augmentation&newsearch=true, accessed Nov. 20, 2018, 3 pages.
Baskent, "Cognitive Compensation of Speech Perception With Hearing Impairment, Cochlear Implants, and Aging", https://www.ncbi.nlm.nih.gov/pmc/articles/PMC5056620/, Oct. 7, 2016, 23 pages.
ACM Search, https://www.acm.org/search?q=listener+based+Cognitive+audio+voice+processing+augmentation, accessed Nov. 20, 2018, 3 pages.
ImageNet, https://en.wikipedia.org/wiki/ImageNet, Wikipedia, last edited on Oct. 24, 2018, 4 pages.
Aytar et al., "SoundNet: Learning Sound Representations from Unlabeled Video", 2016, 7 pages.

\* cited by examiner

AUTOMATICALLY ALTERING THE AUDIO OF AN OBJECT DURING VIDEO CONFERENCES

BACKGROUND

The present invention relates generally to video conferencing and, more particularly, to automatically altering the audio of an object during video conferences.

Video conferencing is a computer-based communication session between two users or a group of users, regardless of their location, while enabling the participants to see and hear each other in a way determined by the type of a video conference. Although referred to as video conferencing, these communication sessions involve both audio and video communication.

SUMMARY

In a first aspect of the invention, a computer-implemented method includes: obtaining, by a computer device, monitoring data of a user participating in a video conference; determining, by the computer device, a level of understanding of the user based on the monitoring data; adjusting, by the computer device, an output of the video conference for the user based on the determined level of understanding being less than a threshold; and determining, by the computer device, a success of the adjusting and updating a learning model based on the determined success.

In another aspect of the invention, there is a computer program product including a computer readable storage medium having program instructions embodied therewith. The program instructions are executable by a computer device to cause the computer device to: obtain a profile of a user participating in a video conference; make an initial adjustment to an output of the video conference that is presented to the user, wherein the initial adjustment is based on data in the profile; obtain monitoring data of the user during the video conference; determine a level of understanding of the user based on the monitoring data; further adjust the output of the video conference that is presented to the user based on the determined level of understanding being less than a threshold; determine a success of the further adjusting; and update a learning model based on the determined success.

In another aspect of the invention, there is system including a processor, a computer readable memory, and a computer readable storage medium. The system includes: program instructions to obtain a profile of a user participating in a video conference; program instructions to make an initial adjustment to an output of the video conference that is presented to the user, wherein the initial adjustment is based on data in the profile; program instructions to obtain monitoring data of the user during the video conference; program instructions to determine a level of understanding of the user based on the monitoring data; program instructions to further adjust the output of the video conference that is presented to the user based on the determined level of understanding being less than a threshold; program instructions to determine a success of the further adjusting; and program instructions to update a learning model based on the determined success. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
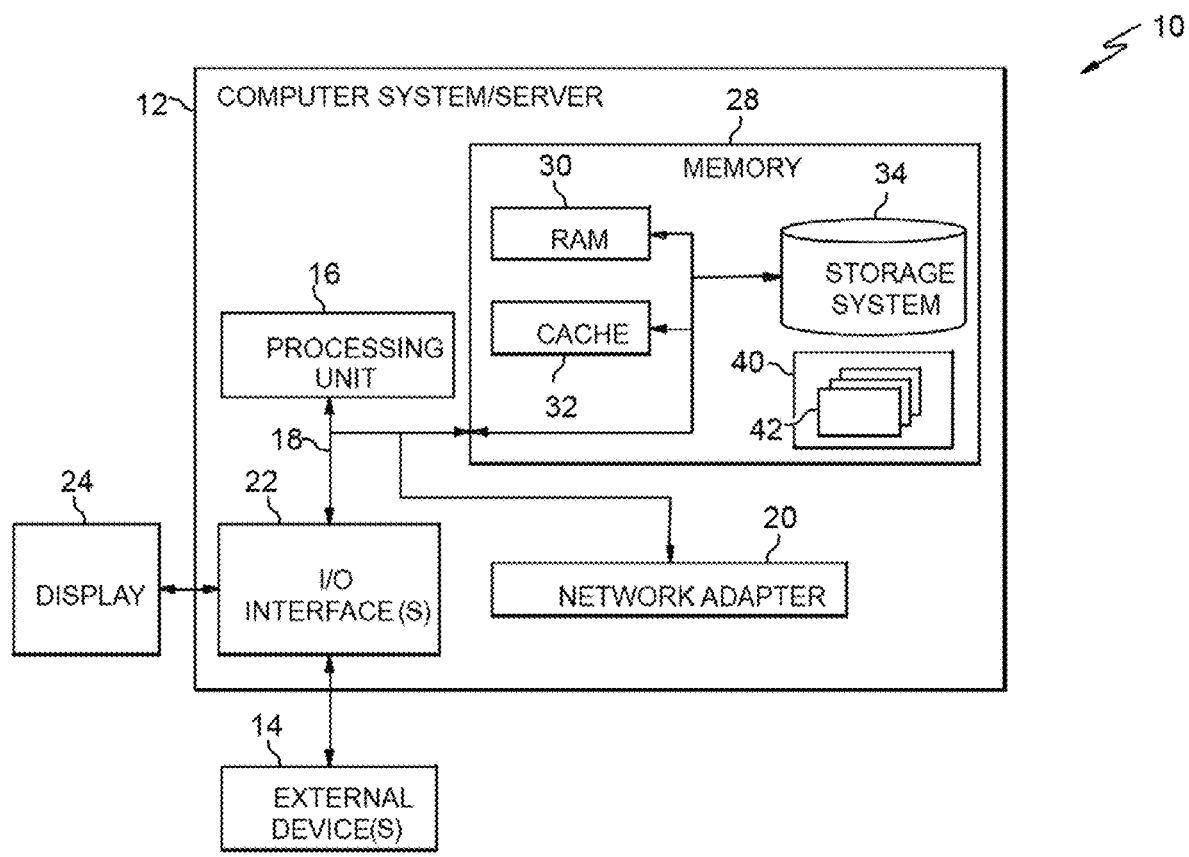
FIG. 1 depicts a computer infrastructure according to an embodiment of the present invention.

The present invention relates generally to video conferencing and, more particularly, to automatically altering the audio of an object during video conferences. In a video conference with plural participants, each person typically has different audio characteristics and word choices. Some people speak more slowly than others, some have a very high voice, low pitch, high pitch, etc. Moreover, different participants may be speaking in different languages. Further, even when speaking the same language, different participants may have very different accents. These types of differences, alone or combined, can make it difficult for one participant to understand the spoken discourse of another participant during a video conference. Aspects of the invention address this problem by altering and augmenting the audio of difficult to interpret voices based on the listener's ability to understand someone speaking during a video conference to make it easier and clearer for the listener to understand the speaker.

Implementations of the invention introduce cognitive processing to a live or recorded video conference tailored for individual consumption. The inventors recognize that different participants of a video conference have different levels of interpretation and understanding. According to aspects of the invention, a system categorizes distinct audio streams and determines a customized operation to be applied to those streams tailored for an individual listener (e.g., an individual participant of the video conference). In embodiments, sensors obtain biometric data of the participant during the video conference, and the system determines a level of understanding of the participant based on the biometric data. In this manner, the system determines whether the participant is having difficulty understanding the spoken discourse in the video conference. In embodiments, the system records the interpreted feedback, makes adjustments to the audio feeds for the participant as they are presented, and stores data regarding the success/failure of any adjustments thus made. Non-limiting examples of the type of adjustments to the audio include changing one or more of the volume, tempo, pitch, and accent, especially for non-native languages of the listener profiles. For example, low tones may be made higher for hearing or ability to absorb, speech context, and speech to text with altering word substitution or captioning. In embodiments, the system improves over time based on systematic adjustments to processing feedback analysis from the listener.

According to aspects of the invention, a system is configured to automatically adjust an audio signal of a video conference based on a detected language and a target listener. In embodiments, the system performs cognitive interpretation of listener biometric data to adjust the audio signal of the video conference for the listener. In further embodiments, the system automatically detects term augmentation of detected accents to control audio speed to target a listener's ability to interpret spoken discourse in the video conference. In implementations, the system is configured to perform a method comprising: accessing a profile that defines a listener's biometric data; making adjustments to the audio feed of a video conference based on information collected about the listener; obtaining biometric data about the listener during the video conference, e.g., using biometric sensor devices; determining difficulties the listener is experiencing based on the biometric data; making further adjustments to the audio feed based on the determined difficulties; and collecting and storing additional information regarding refinements made for the listener in order to improve the adjustments made over time. In additional implementations, the system is configured to perform a method for altering the audio of an object in a video session, the method comprising: creating a user profile based upon native language, other languages understood by the user, hearing ability, room acoustics, etc.; adjusting an audio stream based upon the user profile; monitoring user feedback by interpreting biometric data for the level of understanding of the audio by the user; determining if further adjustments are needed based upon the monitoring; and adjusting the audio stream to increase the level of understanding based upon the biometric data. In aspects, the adjusting the audio stream comprises adjusting one or more of volume, tempo, pitch, accent, etc.

Embodiments of the invention improve the technology of video conferencing by providing users with automated tools that determine a user's level of understanding during video conferences and automatically adjust output of the video conference that is presented to the user based on the determined level of understanding. Embodiments of the invention employ an unconventional arrangement of steps including: obtaining, by a computer device, monitoring data of a user participating in a video conference; determining, by the computer device, a level of understanding of the user based on the monitoring data; adjusting, by the computer device, an output of the video conference for the user based on the determined level of understanding being less than a threshold; and determining, by the computer device, a success of the adjusting and updating a learning model based on the determined success. The steps themselves are unconventional, and the combination of the steps is also unconventional. For example, the step of determining a user's level of understanding during a video conference and based on monitoring data creates new information that does not otherwise exist, and this new information is then used in subsequent steps in an unconventional manner. Embodiments of the invention are also rooted in computer technology by virtue of employing techniques that are only present in computer technology, such as video conferencing and computer vision.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
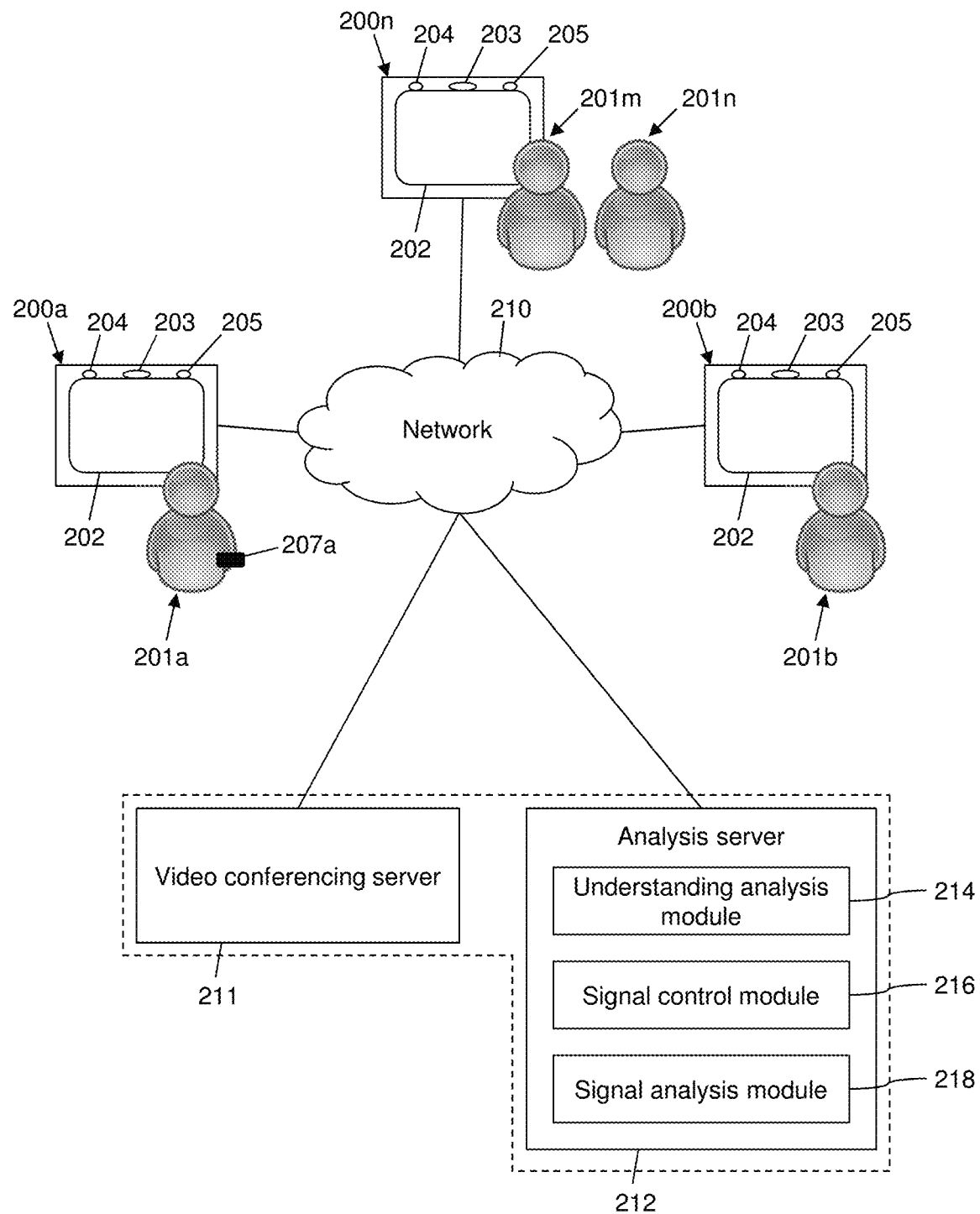
FIG. 2 shows a block diagram of an exemplary environment in accordance with aspects of the invention.

FIG. 2 shows a block diagram of an exemplary environment in accordance with aspects of the invention. The environment includes a first user device 200a associated with a first user 201a, a second user device 200b associated with a second user 201b, and an $n^{th}$ user device 200n associated with an $n^{th}$ user 201n. Each of the user devices 200a-n comprises a computer device such as a laptop computer, desktop computer, table computer, smartphone, etc., and may include one or more elements of computer system 12 of FIG. 1. In accordance with aspects of the invention, each of the user devices 200a-n is configured to perform video conferencing functions for its respective user. To this end, in embodiments, each of the user devices 200a-n includes (or is operatively connected to) a display screen 202 for displaying video images to a user, a camera 203 for capturing video images of the user, a microphone 204 for capturing audio (e.g., speech) emitted by the user, and a speaker 205 for emitting audio to the user. In this manner, the users 201a-n may utilize their respective user devices 200a-n to conduct a video conference with one another. Embodiments of the invention may be implemented with two users, e.g., users 201a and 201b, or with any number "n" users 201a-n joining the video conference via different user devices 200a-n.

As depicted in FIG. 2, the user devices 200a and 200b communicate with each other via a network 210. In embodiments, the network 210 is a communication network such as a LAN, WAN, or the Internet, or a combination of two or more such communication networks.

In some implementations, as shown in FIG. 2, a video conferencing server 211 is connected to the network 210. The video conferencing server 211 is a computer device, such as computer system 12 of FIG. 1, that is configured to provide video conference services to the user devices 200a-n, e.g., in a client-server arrangement. For example, the video conferencing server 211 may be configured to receive audio and video signals from all the user devices 200a-n, and to generate and transmit respective audio and video signals to each of the user devices 200a-n.

Still referring to FIG. 2, according to aspects of the invention, an analysis server 212 is also connected to the network 210 and configured to communicate with the user devices 200a-n and/or the video conferencing server 211 via the network 210. The analysis server 212 is a computer device, such as computer system 12 of FIG. 1, that is configured to receive audio and video signals of a video conference that the users 201a-n that are conducting using user devices 200a-n. In embodiments, the analysis server 212 adjusts one or more of the audio signals in the video conference based on analysis as described herein.

In embodiments, the analysis server 212 comprises an understanding analysis module 214, a signal control module 216, and a signal analysis module 218, each of which may comprise one or more program modules such as program modules 42 described with respect to FIG. 1. The analysis server 212 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In embodiments, the video conference server 211 and the analysis server 212 are separate servers. In other embodiments, the functions performed by the video conference server 211 and the analysis server 212 are performed by a single server as indicated by the dashed line in FIG. 2.

According to aspects of the invention, the understanding analysis module 214 is configured to determine a level of understanding of a participant of a video conference, such as a video conference conducted by the users 201a-n via the user devices 200a-n. In embodiments, the understanding analysis module 214 is configured to: receive monitoring data associated with a first one of the users (e.g., user 201a) during the video conference; receive an audio signal of a second one of the users (e.g., user 201b) during the video conference; and determine the first user's level of understanding of the spoken discourse of the second user based on analyzing the monitoring data of the first user relative to the audio signal of the second user.

In embodiments, the monitoring data associated with the first user (e.g., user 201a) is obtained from at least one of: the camera 203 of the user device 200a; and one or more biometric devices 207a worn by the first user 201a. In embodiments, the understanding analysis module 214 obtains the monitoring data in real time or near real time during the video conference.

In the case of the camera 203, the monitoring data includes video signals that the understanding analysis module 214 analyzes to determine body language of the first user 201a. Body language can include facial expression (e.g., frown, pasted smile, tight-lipped smile, twisted smile, brow furrow, yawn, etc.) and/or body positioning (e.g., chin on hand, head cocked up to the left, crossed arms, etc.). In embodiments, by comparing detected body language of the first user 201a to the audio signal of the second user 201b, the understanding analysis module 214 determines a relative (e.g., quantitative) measure of how well the first user 201a understands the spoken discourse contained in the audio signal of the second user 201b. For example, the understanding analysis module 214 may access data that defines correlations between respective body language traits and respective levels of understanding, and based on detecting certain ones of the body language traits in the body language of the first user 201a, the understanding analysis module 214 may use the correlated respective levels of understanding to generate an understanding score for the first user 201a. In this manner, the understanding analysis module 214 may use data from the video camera 203 to determine a level of understanding of the first user 201a during the video conference.

In the case of the biometric devices 207a, the monitoring data includes biometric data of the first user 201a. The biometric data may include, for example, heart rate, skin temperature, blood pressure, and electroencephalogram (EEG) data, each of which may be detected by the one or more biometric devices 207a worn by the first user 201a during the video conference. The one or more biometric devices 207a may include, for example, a fitness band, a heart rate monitor, an EEG device, etc., that are wired or wirelessly connected to the user device 200a. In embodiments, by comparing detected biometric data of the first user 201a to the audio signal of the second user 201b, the understanding analysis module 214 determines a relative (e.g., quantitative) measure of how well the first user 201a understands the spoken discourse contained in the audio signal of the second user 201b. For example, the understanding analysis module 214 may access data that defines correlations between respective biometric data values and respective levels of understanding, and based on detecting certain ones of the biometric data values in the first user 201a, the understanding analysis module 214 may use the correlated respective levels of understanding to generate an understanding score for the first user 201a. In this manner, the understanding analysis module 214 may use data from the one or more biometric devices 207a worn by the first user 201a during the video conference to determine a level of understanding of the first user 201a during the video conference.

In embodiments, the understanding analysis module 214 determines the level of understanding of the first user 201a based on monitoring data that includes data from both the camera 203 and the one or more biometric devices 207a. In further embodiments, the understanding analysis module 214 the monitoring data and the audio signal each include respective time data, and the understanding analysis module 214 uses the time data to determine different levels of understanding of the first user 201a for different time segments of the audio signal of the second user 201b.

Still referring to FIG. 2, the signal control module 216 is configured to adjust the video conference output that is presented to the first user 201a based on the level of understanding of the first user 201a determined by the understanding analysis module 214. In embodiments, in response to the determined level of understanding of the first user 201a being less than a predefined threshold amount, the signal control module 216 adjusts one or more characteristics of the audio signal of the second user 201b to attempt to cause an increase in the determined level of understanding of the first user 201a. In embodiments, the adjustment to the audio signal of the second user 201b includes one or more of: increasing or decreasing a tempo of the audio signal of the second user 201b; increasing or decreasing a pitch of the audio signal of the second user 201b; increasing or decreasing a volume of the audio signal of the second user 201b. In one example, based on determining the first user 201a's level of understanding is less than the threshold amount, the signal control module 216 adjusts the audio signal of the second user 201b such that low audio tones are increased to a higher tone level prior to being output to the first user, e.g., at the first user device 200a. In this manner, the system adjusts the video conference output that is presented to the first user 201a in an attempt to cause an increase in a level of understanding of the first user 201a.

In further embodiments, the adjustment to the video conference output that is presented to the first user 201a includes adjusting the video signal to include text captioning that corresponds to the spoken discourse contained in the audio signal of the second user 201b. In one example, based on determining the first user 201a's level of understanding is less than the threshold amount, the signal control module 216 uses speech-to-text techniques to convert the spoken discourse contained in the audio signal of the second user 201b to text, and modifies the video signal that is presented to the first user (e.g., via the display 202 of the first user device 200a) to include text captioning that presents the speech-to-text results. In embodiments, the signal control module 216 further adjusts the text that is presented in this manner with altering word substitution or captioning. In this manner, the system adjusts the video conference output that is presented to the first user 201a in an attempt to cause an increase in a level of understanding of the first user 201.

According to aspects of the invention, the understanding analysis module 214 determines the first user 201a's level of understanding after an adjustment made by the signal control module 216, and the signal control module 216 uses this data as feedback for learning how well certain adjustments work (or do not work) in increasing the level of understanding of the first user 201a. For example, the signal control module 216 may be configured to compare the determined level of understanding of the first user 201a at respective times before and after an adjustment to the video conference output that is presented to the first user 201a, and based on this comparing to determine whether the adjustment to the video conference output increased or decreased the level of understanding of the first user 201a. In the event that the adjustment to the video conference output increased the level of understanding of the first user 201a, then the signal control module 216 deems the adjustment to the video conference output a success and scores the adjustment to the video conference output (e.g., in a learning model) such that the signal control module 216 is more likely to make the same adjustment to the video conference output in subsequent video conferences. In the event that the adjustment to the video conference output decreased the level of understanding of the first user 201a, then the signal control module 216 deems the adjustment to the video conference output a failure and scores the adjustment to the video conference output (e.g., in a learning model) such that the signal control module 216 is less likely to make the same adjustment to the video conference output in subsequent video conferences. In this manner, the system determines a success of the adjusting and updates a learning model based on the determined success.

With continued reference to FIG. 2, in embodiments the analysis server 212 stores or has access to a profile of the first user 201a, and uses data in the profile to make an initial adjustment to the video conference output that is presented to the first user 201a. In embodiments, the profile of a user (e.g., user 201a) includes data defining at least one of: primary spoken language of the user; other languages understood by the user; user-specified level of understanding of each of the other languages understood by the user; hearing ability of the user; room acoustics; and other attributes. In embodiments, the user manually specifies the data in the profile in a pre-configuration step, e.g., via a user interface presented via the display 202 of the user device 200a. According to aspects of the invention, at the beginning of a video conference between two users (e.g., first user 201a and second user 201b), the signal control module 216 accesses the data in the profile of the first user (e.g., user 201a) and adjusts the video conference output that is presented to the first user 201a based on the data contained in the profile of the first user. The adjustments may include those already described herein (e.g., adjusting tempo, pitch, and/or volume of the audio signal, and/or adjusting the video output by providing text transcription). The adjustments may be made based on predefined rules that equate certain values of data in the user profile to certain types of adjustments. In one example, the analysis server 212 determines a language that the second user 201b is speaking at the beginning of the video conference, compares the determined language to languages indicated in the user profile of the first user 201a, and adjusts the video conference output that is presented to the first user 201a based on a user-specified level of understanding of the determined language contained in the user profile of the first user 201a, wherein the adjustment comprises one of the types of adjustments already described herein.

Still referring to FIG. 2, in accordance with aspects of the invention, the analysis server 212 includes a signal analysis module 218 that is configured to analyze the audio signals and the video signals of the video conference to determine correlations between audible sounds and visual objects in the video conference output. In this manner, the system determines which sounds are emitted by respective persons in a video conference, even though there might be plural people in a single audio/video stream of the video conference (e.g., a first user 201a at user device 200a and plural users 201m and 201n sharing a single user device e.g., 200n).

According to aspects of the invention, the signal control module 216 generates a new video conference output (e.g., audio/video signal that is presented to the first user 201a) based on the output of the signal analysis module 218. In embodiments, the new video conference output includes an increased audio volume for the sounds emitted by at least one of the participants, and a decreased audio volume for the sounds emitted by other ones of the participants. In embodiments, the at least one of the participants (e.g., for which the volume of their speech is increased) is a determined focus object of the first user (e.g., user 201a) during the video conference.

In embodiments, the signal analysis module 218 uses computer vision to segment the objects (e.g., participants) in the video stream of the video conference. In these embodiments, the signal analysis module 218 performs time series analysis of the images in the video stream and correlation to the sounds in the audio stream to determine which sounds corresponds to each object in the video stream. In these embodiments, the signal control module 216 determines which one of the objects is a focus of the first user (e.g., user 201a), and increases the volume of the sounds that are determined as corresponding to this focus object. In these embodiments, the signal control module 216 also decreases the volume of sounds that are determined as corresponding to objects other than the focus object. In this manner, the system increases the volume of the spoken discourse of the video conference participant that the first user 201a is focusing on, and decreases the volume of the spoken discourse other video conference participants that the first user 201a is not focusing on. In embodiments, these particular adjustments are made for the first user only, and the system makes different adjustments for different users in the same video conference. In this manner, each respective participant of the video conference is provided with a respective adjusted video conference output that is tailored to the particular participant's focus.

In accordance with further aspects of the invention, in addition to increasing the volume spoken discourse of the video conference participant on which the first user 201a is focusing, the signal analysis module 218 is configured to provide cascading amplification of spoken discourse of participants who are discussing topics that are related to the topic being discussed by the video conference participant on which the first user 201a is focusing. In embodiments, the signal analysis module determines a respective topic associated with the spoken discourse of each of the respective objects (e.g., participants). For example, the signal analysis module 218 may use speech-to-text to convert the audio signal of the spoken discourse of each participant to text, and then analyze the text using natural language processing techniques to determine a topic of the spoken discourse for that particular participant. Based on determining a topic of the spoken discourse of each of the participants, the signal analysis module 218 determines which of the determined topics are related to the topic of the spoken discourse of the focus object (i.e., the video conference participant on which the first user 201a is focusing). Topics are considered as related when a similarity score of the topics exceeds a predefined threshold value, where the similarity score is determined using one or more algorithms defined in the signal analysis module 218. The signal control module 216 then increases the volume of the spoken discourse corresponding to each of the topics that are determined as being related to the topic of the spoken discourse of the focus object. In this manner, the analysis server 212 provides cascading amplification of spoken discourse of certain participants in the video conference for the first user 201a.

Figure 3:
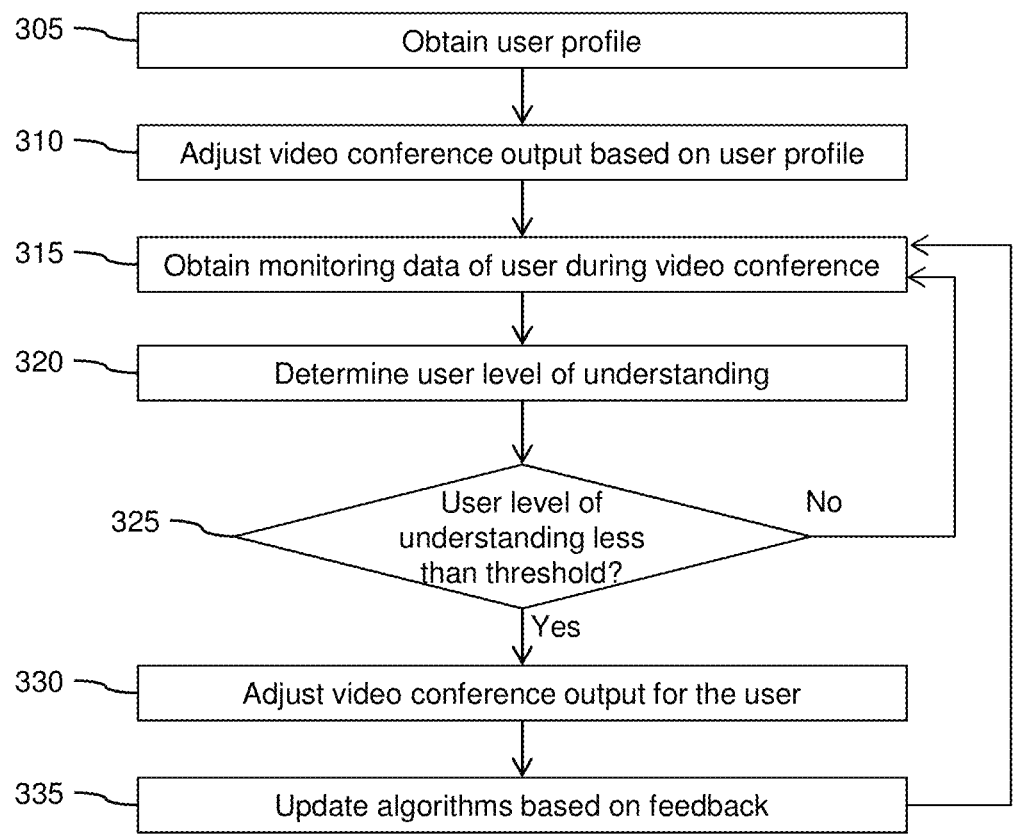
FIGS. 3 and 4 show flowcharts exemplary methods in accordance with aspects of the invention.

FIG. 3 shows a flowchart of an exemplary method in accordance with aspects of the present invention. Steps of the method may be carried out in the environment of FIG. 2 and are described with reference to elements depicted in FIG. 2.

At step 305, the system obtains a user profile. In embodiments, and as described with respect to FIG. 2, the analysis server 212 stores or has access to a profile of a first user (e.g., user 201a) that is engaged in a video conference with at least one second user (e.g., user 201b).

At step 310, the system adjusts the video conference output based on the user profile obtained at step 305. In embodiments, and as described with respect to FIG. 2, the analysis server 212 uses data in the profile to make an initial adjustment to the video conference output that is presented to the first user 201a. The initial adjustment may include adjusting an audio component of the video conference that is output to the first user 201a via the speaker 205 of the first user device 200a. In embodiments, the adjusting the audio component comprises adjusting one or more of the tempo, pitch, and/or volume of the audio signal, as described with respect to FIG. 2. Additionally or alternatively, the initial adjustment may include adjusting a video component of the video conference that is output to the first user 201a via the display 202 of the first user device 200a. In embodiments, the adjusting the video component comprises providing text transcription or changing an already provided text transcription, as described with respect to FIG. 2.

At step 315, the system obtains monitoring data of the user during the video conference. In embodiments, and as described with respect to FIG. 2, the analysis server 212 obtains monitoring data comprising at least one of: video data from the camera 203 of the user device 200a; and biometric data from one or more biometric devices 207a worn by the first user 201a.

At step 320, the system determines a level of understanding of the user based on the monitoring data obtained at step 315. In embodiments, and as described with respect to FIG. 2, the understanding analysis module 214 analyzes the monitoring data to determine a level of understanding of the first user 201a during the video conference.

At step 325, the system determines whether the level of understanding of the user is less than a threshold value. In embodiments, and as described with respect to FIG. 2, the signal control module 216 compares the level of understanding of the first user 201a (determined at step 320) to a predefined threshold. In the event the determined level of understanding equals or exceeds the threshold, then the user is deemed to sufficiently understand the spoken discourse of the video conference, and the method returns to step 315 to continue obtaining new monitoring data. In the event the determined level of understanding is less than the threshold, then the user is deemed to have difficulty understanding the spoken discourse of the video conference, and the method proceeds to step 330.

At step 330, the system adjusts the video conference output for the user. In embodiments, and as described with respect to FIG. 2, the signal control module 216 adjusts the video conference output that is presented to the first user 201a. The adjustment may include adjusting an audio component of the video conference that is output to the first user 201a via the speaker 205 of the first user device 200a. In embodiments, the adjusting the audio component comprises adjusting one or more of the tempo, pitch, and/or volume of the audio signal, as described with respect to FIG. 2. Additionally or alternatively, the adjustment may include adjusting a video component of the video conference that is output to the first user 201a via the display 202 of the first user device 200a. In embodiments, the adjusting the video component comprises providing text transcription or changing an already provided text transcription, as described with respect to FIG. 2.

At step 335, the system optionally updates one or more algorithms used to adjust the video conference output based on feedback from the user. In embodiments, and as described with respect to FIG. 2, the feedback may be in the form of additional monitoring data obtained after the adjustment to the video conference output. Additionally or alternatively, the feedback may be manually entered by the first user 201a, e.g., via user interface of the first user device 200a. In this manner, the system determines a success of the adjusting and updates a learning model based on the determined success. Following step 335, the method returns to step 315 to continue obtaining new monitoring data.

Figure 4:
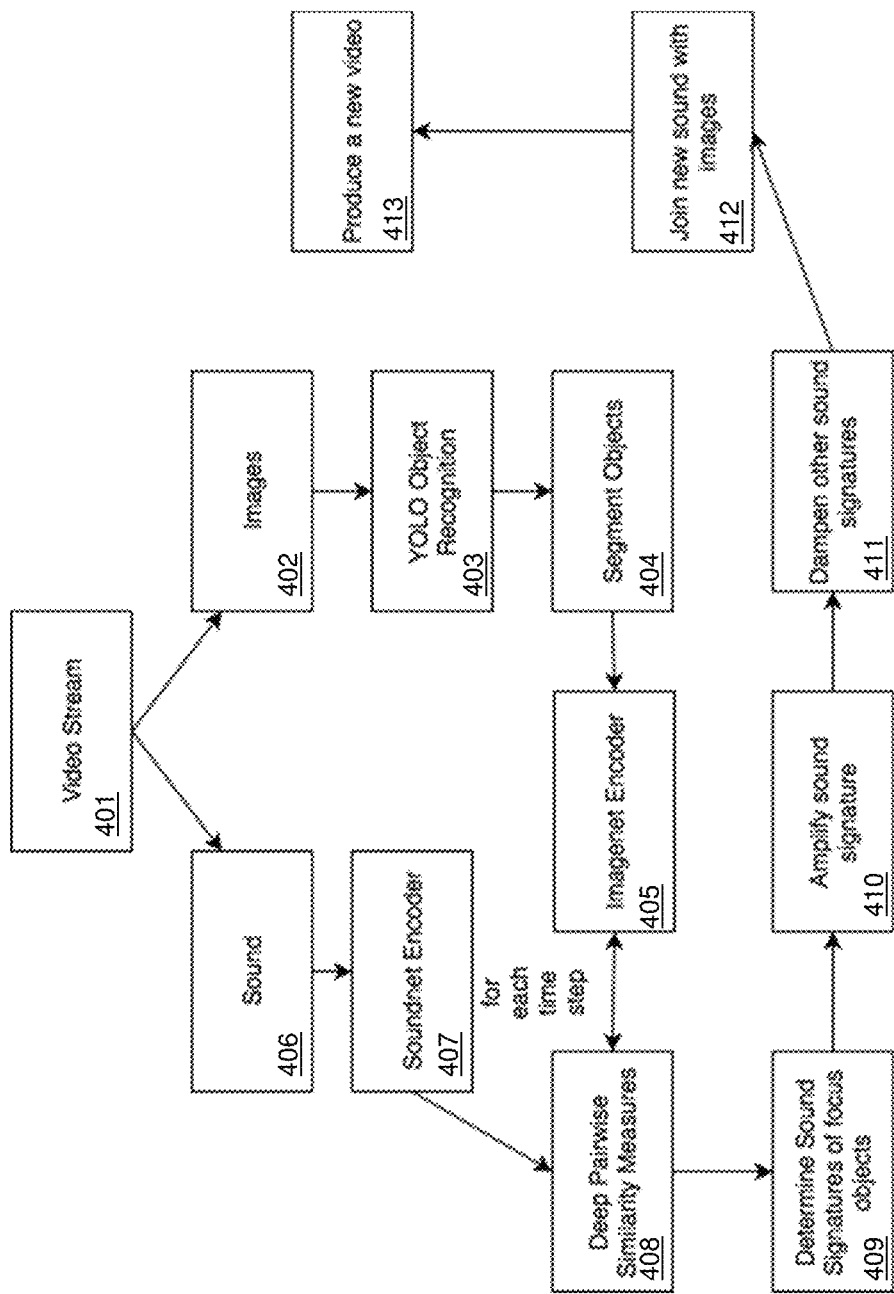

FIG. 4 shows a flowchart of an exemplary method in accordance with aspects of the present invention. Steps of the method may be carried out in the environment of FIG. 2 and are described with reference to elements depicted in FIG. 2.

At step 401, the analysis server 212 obtains a stream of a video conference. In embodiments, and as described with respect to FIG. 2, the video conference is between plural users 201a, 201b, . . . , 201m, 201n using user devices 200a, 200b, . . . , 201n.

At step 402, the signal analysis module 218 of the analysis server 212 obtains the video component (e.g., images) of the video conference stream. At step 403, the signal analysis module 218 performs object recognition on the video component. In embodiments, the object recognition comprises using computer vision, such as YOLO (you only look once) real time object detection. At step 404, the signal analysis module 218 segments objects in the video component. For example, when plural users 201m and 201n are using a single user device 200n, the signal analysis module 218 uses computer vision to segment images of the different users 201m and 201n in the video component. At step 405, the signal analysis module 218 identifies objects in the video component using an image database, such as an ImageNet encoder.

Running in parallel to steps 402-405, at step 406 the signal analysis module 218 obtains the audio component (e.g., audio) of the video conference stream. At step 407, the signal analysis module 218 identifies sounds in the audio component using a sound database, such as a SoundNet encoder.

At step 408, the signal analysis module 218 determines which sounds in the audio component correspond to identified objects in the video component. In embodiments, the signal analysis module 218 uses deep pairwise similarity measures to match sounds in the audio component correspond to objects in the video component.

At step 409, the system determines sound signatures of focus objects. In embodiments, and as described with respect to FIG. 2, the signal control module 216 determines which one of the objects is a focus of the first user (e.g., user 201a). In embodiments, the signal control module 216 uses the monitoring data associated with the first user 201a to determine which of the other participants the first user 201a is focusing on. For example, the signal control module 216 may use camera data to determine which one of the participants the first user is looking at in the video feed of the video conference. Additionally or alternatively, the signal control module 216 may compare changes in the biometric data of the first user to changes in the audio signals associated with each of the other participants to determine which one of the other participants the first user 201a is focusing on.

At step 410, the system amplifies the sound signature of the focus object determined at step 409. In embodiments, and as described with respect to FIG. 2, the signal control module 216 increases the volume level of the spoken discourse associated with the focus object, i.e., the other one of the participants on which the first user 201a is focusing at this time during the video conference. Step 410 may optionally include the signal control module 216 performing cascading amplification of sound signatures that are related to the sound signature of the focus object, as described with respect to FIG. 2.

At step 411, the system dampens the other sounds signatures. In embodiments, and as described with respect to FIG. 2, the signal control module 216 decreases the volume level of the spoken discourse associated with objects other than the focus object, i.e., the other ones of the participants that the first user is not focusing on at this time during the video conference. In embodiments where cascading amplification is performed at step 410, step 411 does not decrease the volume level of objects that are related to the focus object. In this manner, the system avoids decreasing the volume of objects whose volume is increased as part of cascading amplification.

At step 412, the signal control module 216 joins the new sound signals (from steps 410 and 411) with the images (e.g., from step 402). At step 413, the signal control module 216 produces a new video conference output that includes the new sound signals joined with the images. In embodiments, the new video conference output is provided to the first user 201a via the display 202 and the speaker 205 of the first user device 200a.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   obtaining, by a computer device, monitoring data of a user participating in a video conference;
   determining, by the computer device, a level of understanding of the user based on the monitoring data;
   adjusting, by the computer device, an output of the video conference for the user based on the determined level of understanding being less than a threshold;
   determining, by the computer device, a success of the adjusting and updating a learning model based on the determined success;
   using computer vision to segment and identify objects in video of the video conference;
   matching sounds in audio of the video conference to the identified objects; and
   determining one of the identified objects as a focus object of the user,
   wherein the adjusting the output of the video conference comprises: increasing volume of sounds associated with the focus object, and decreasing volume of sounds of other ones of the identified objects.

2. The method of claim 1, wherein the monitoring data comprises video data and/or biometric data of the user.

3. The method of claim 1, wherein the adjusting the output of the video conference comprises adjusting an audio component of the video conference that is output to the user via a speaker.

4. The method of claim 3, wherein the adjusting the audio component comprises adjusting at least one selected from the group consisting of tempo, pitch, and volume.

5. The method of claim 1, wherein the adjusting the output of the video conference comprises adjusting a video component of the video conference that is output to the user via a display.

6. The method of claim 5, wherein the adjusting the video component comprises providing a text transcription or changing an already provided text transcription.

7. The method of claim 1, wherein the determining the success of the adjusting comprises:
   determining a new level of understanding of the user after the adjusting; and
   comparing the level of understanding to the new level of understanding.

8. The method of claim 1, further comprising:
   obtaining a profile of the user;
   making an initial adjustment to the output of the video conference based on data in the profile.

9. A computer program product, the computer program product comprising a computer readable storage medium having program instructions embodied therewith, the program instructions executable by a computer device to cause the computer device to:
   obtain a profile of a user participating in a video conference;
   make an initial adjustment to an output of the video conference that is presented to the user, wherein the initial adjustment is based on data in the profile;
   obtain monitoring data of the user during the video conference;
   determine a level of understanding of the user based on the monitoring data;
   further adjust the output of the video conference that is presented to the user based on the determined level of understanding being less than a threshold;
   determine a success of the further adjusting;
   update a learning model based on the determined success;
   use computer vision to segment and identify objects in video of the video conference;
   match sounds in audio of the video conference to the identified objects; and
   determine one of the identified objects as a focus object of the user,
   wherein the further adjusting the output of the video conference comprises: increasing volume of sounds associated with the focus object, and decreasing volume of sounds of other ones of the identified objects.

10. The computer program product of claim 9, wherein the monitoring data comprises video data of the user and/or biometric data of the user.

11. The computer program product of claim 9, wherein the adjusting the output of the video conference comprises adjusting at least one selected from the group consisting of tempo, pitch, and volume of audio of the video conference.

12. A system comprising:
   a processor, a computer readable memory, and a computer readable storage medium;
   program instructions to obtain a profile of a user participating in a video conference;
   program instructions to make an initial adjustment to an output of the video conference that is presented to the user, wherein the initial adjustment is based on data in the profile;
   program instructions to obtain monitoring data of the user during the video conference;
   program instructions to determine a level of understanding of the user based on the monitoring data;
   program instructions to further adjust the output of the video conference that is presented to the user based on the determined level of understanding being less than a threshold;
   program instructions to determine a success of the further adjusting;
   program instructions to update a learning model based on the determined success;
   program instructions to use computer vision to segment and identify objects in video of the video conference;
   program instructions to match sounds in audio of the video conference to the identified objects; and program instructions to determine one of the identified objects as a focus object of the user, wherein the further adjusting the output of the video conference comprises: increasing volume of sounds associated with the focus object, and decreasing volume of sounds of other ones of the identified objects, and wherein the program instructions are stored on the computer readable storage medium for execution by the processor via the computer readable memory.

13. The system of claim 12, wherein the monitoring data comprises video data of the user and/or biometric data of the user.

* * * * *